United States Patent [19]

Iwagami et al.

[11] Patent Number: 4,734,718

[45] Date of Patent: Mar. 29, 1988

[54] INK JET PRINTER NOZZLE CLOG PREVENTIVE APPARATUS

[75] Inventors: Fusao Iwagami; Minoru Sakama, both of Nara, Japan

[73] Assignee: Sharp Kabushiki Kaisha, Osaka, Japan

[21] Appl. No.: 48,963

[22] Filed: May 13, 1987

Related U.S. Application Data

[63] Continuation of Ser. No. 828,889, Feb. 13, 1986, abandoned.

[30] Foreign Application Priority Data

Feb. 13, 1985 [JP] Japan ................................ 60-27397

[51] Int. Cl.[4] ............................................ G01D 15/16

[52] U.S. Cl. ............................................ 346/140 R

[58] Field of Search ........................................ 346/140

[56] References Cited

U.S. PATENT DOCUMENTS 4,296,418 10/1981 Yamazaki ............................ 346/140
4,540,997 9/1985 Biggs .................................. 346/140
4,543,591 9/1985 Terasawa ............................ 346/140
4,546,363 10/1985 Iwagami ............................ 346/140
4,571,600 2/1986 Hara .................................. 346/140
4,587,535 5/1986 Watanabe ............................ 346/140

FOREIGN PATENT DOCUMENTS 3316968 11/1983 Fed. Rep. of Germany .

*Primary Examiner*—Joseph W. Hartary
*Attorney, Agent, or Firm*—Birch, Stewart, Kolasch & Birch

[57] ABSTRACT

An ink jet printer nozzle clog preventive apparatus includes a cap member provided opposite a printing head on a carriage positioned outside the printing zone, the cap member being movable toward and away from the printing head, a moving mechanism including a driving source for moving the cap member toward the printing head, a pump connected to the cap member interior to achieve a negative pressure in the cap member when the printing head is covered with the cap member, a maintenance solution tank from which to supply maintenance solution to the cap member interior, a control system for controlling the moving mechanism, pump and maintenance solution tank according to the printer state, and an instruction switch for instructing a nozzle recovery operation when air enters the printing head nozzle.

4 Claims, 7 Drawing Figures

Power OFF

Power ON

INK JET PRINTER NOZZLE CLOG PREVENTIVE APPARATUS

This application is a continuation of application Ser. No. 828,889 filed on Feb. 13, 1986 now abandoned.

BACKGROUND OF THE INVENTION

The present invention relates to an ink jet printer nozzle clog preventive apparatus, or more specifically to a nozzle preventive apparatus which prevents air from entering the nozzle and ink from drying and solidifying at the nozzle while the printer is turned off for transportation or long term storage or while the printer is not operated though turned on.

Generally in an ink jet printer, the ink spray nozzle is exposed to the atmosphere when a printing operation is not conducted. Ink which has filled into the nozzle therefore tends to dry and solidify, clogging the nozzle. During transportation or storage of the printer as well, ink may dry and solidify at the nozzle or air may enter the nozzle, causing a clogged nozzle.

To prevent such clogging troubles, the ink jet printer is conventionally equipped with a cap member (a first cap member) for scaling the nozzle to prevent ink from drying when the printer is turned off or is out of service for an extended period of time with the power on. In addition to the first cap member, the nozzle is also equipped with a second sealing cap member to provide for the clogging trouble which may occur during transportation and long term storage. The second cap member is filled with maintenance solution to prevent air from entering the nozzle as well as to protect ink from dryness.

The conventional ink jet printer thus involves two different sealing cap devices (that is, the first and second cap members) as a nozzle clog preventive means, resulting in a complicated construction.

SUMMARY OF THE INVENTION

The inventor has proposed the present invention to eliminate the above problems of the conventional ink jet printers having a nozzle clog preventive apparatus.

Accordingly, the object of the present invention is to provide an improved ink jet printer nozzle clog preventive apparatus which contains only one sealing cap device for covering the printing head nozzle, the sealing cap device being operated as appropriate for nozzle clog prevention according to the state of the printer (that is, out of service with power on, transportation or storage, or nozzle recovery operation).

Other objects and further scope of applicability of the present invention will become apparent from the detailed description given hereinafter. It should be understood, however, that the detailed description and specific examples, while indicating preferred embodiments of the invention, are given by way of illustration only. Various changes and modifications within the spirit and scope of the invention will become apparent to those skilled in the art from this detailed description.

Specifically, the nozzle clog preventive apparatus of the present invention comprises a cap member, a moving mechanism including a driving power source for shifting the cap member toward the printing head, pump means connected to the cap member to effect a negative pressure in the cap member, maintenance solution supply means for feeding maintenance solution into the cap member, control means for controlling the moving mechanism, pump means and maintenance solution supply means according to the state of the printer, and instruction means for instructing a nozzle recovery operation when air enters the printing head nozzle.

When the printer is out of service with the power ON, the control means actuates the moving mechanism so that the cap member covers the printing head (first operation). When the printer is turned OFF, the control means actuates the moving mechanism to cause the cap member to cover the printing head as well as actuating the maintenance solution supply means to feed the solution into the cap member (second operation). When instructed to perform a nozzle recovery operation, the control means actuates the pump means to depressurize the cap member interior (to a negative pressure) so as to remove bubbles from the nozzle (third operation), after the above second operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
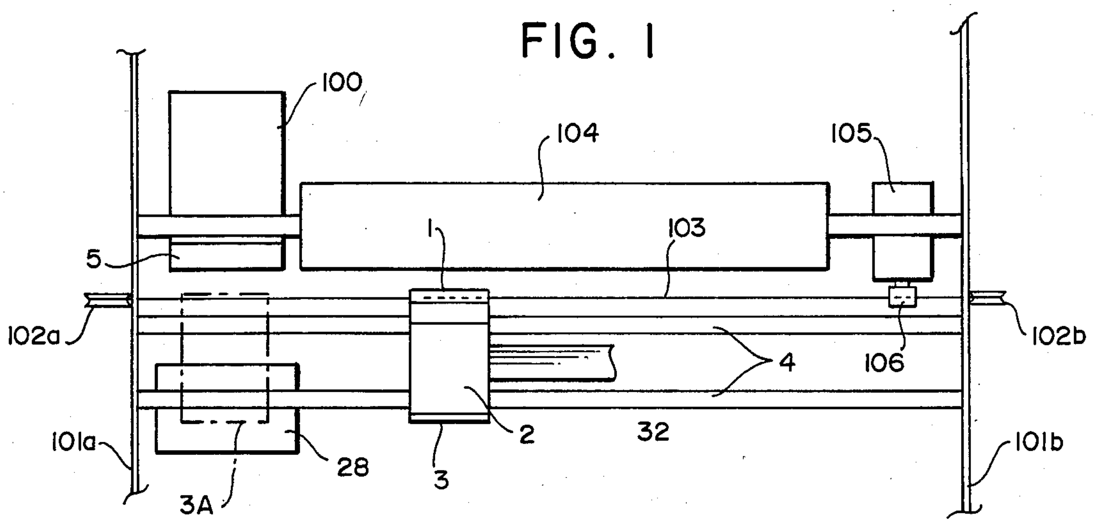
FIG. 1 is a plan view of the printing section of an ink jet printer related to the present invention.
Figure 2:
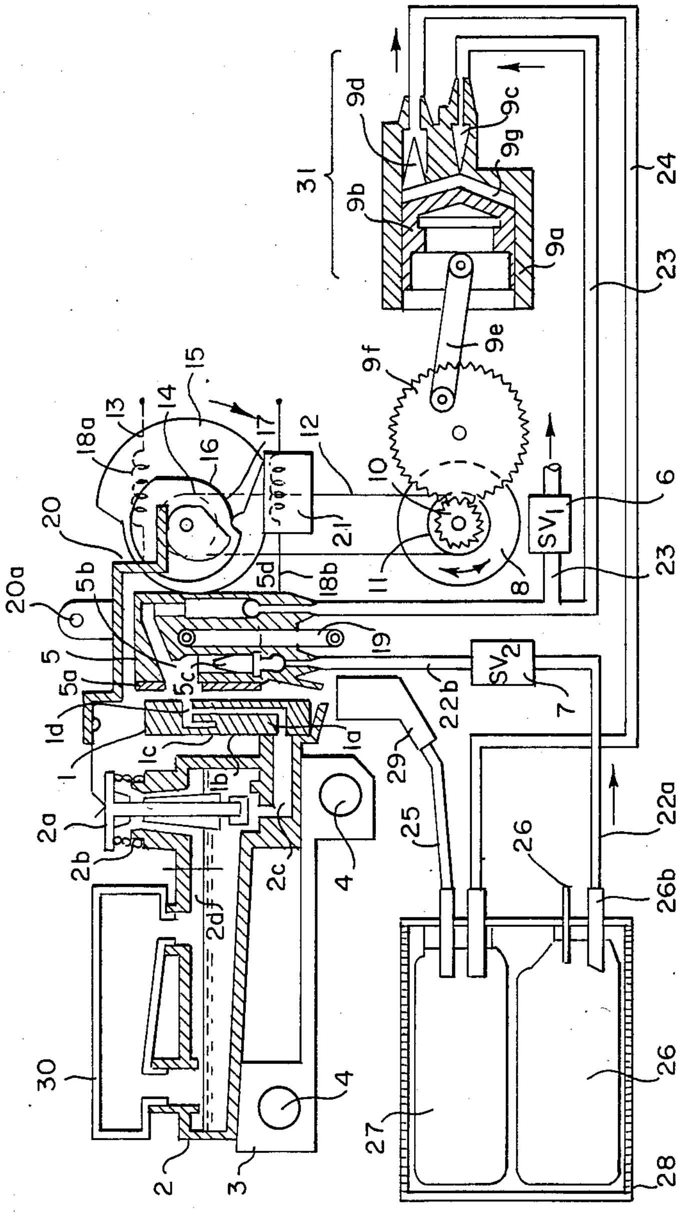
FIG. 2 shows the construction of the nozzle clog preventive apparatus of the present invention provided in the printer of FIG. 1.
Figure 4A:
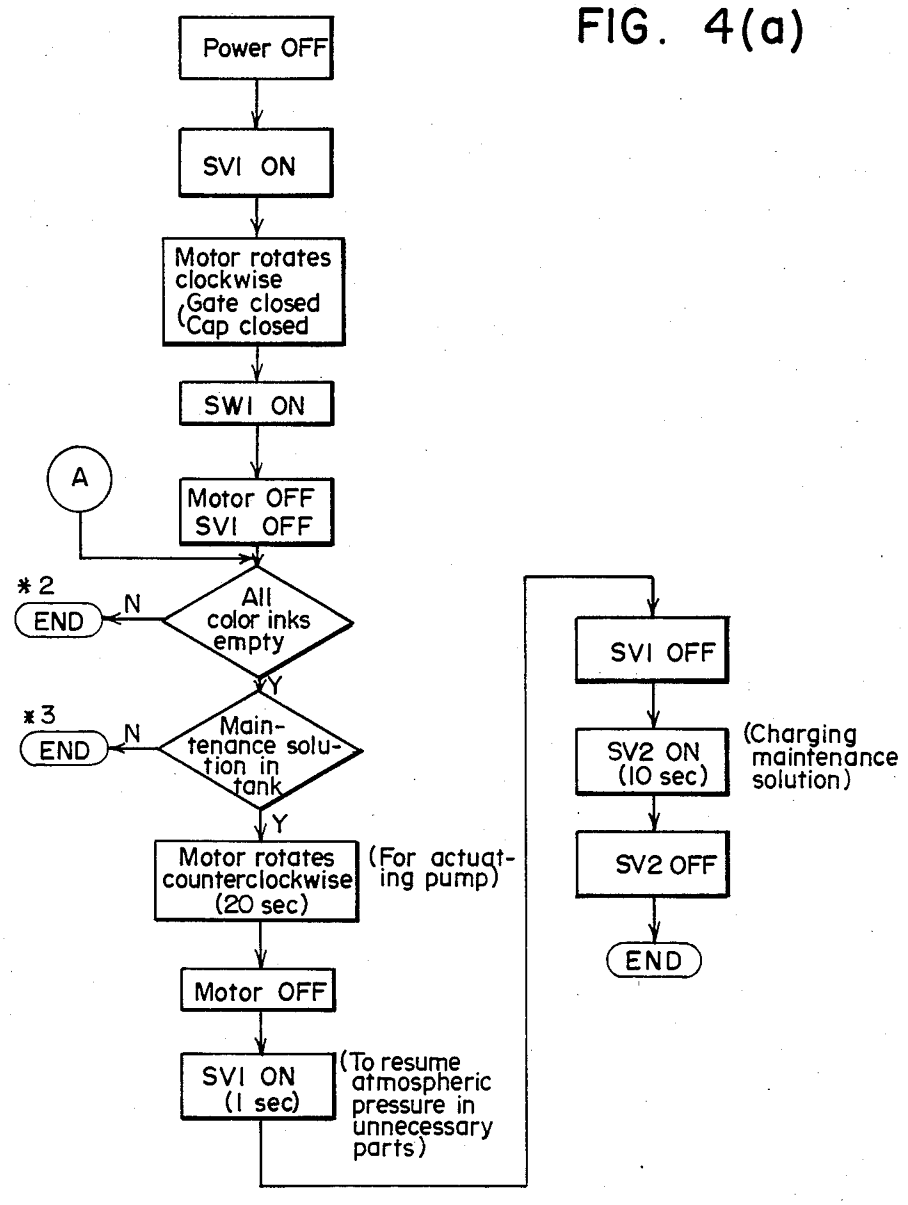
FIGS. 4(*a*) through 4(*d*) are flow charts for showing the operation of the nozzle clog preventive apparatus of the present invention.
Figure 4B:
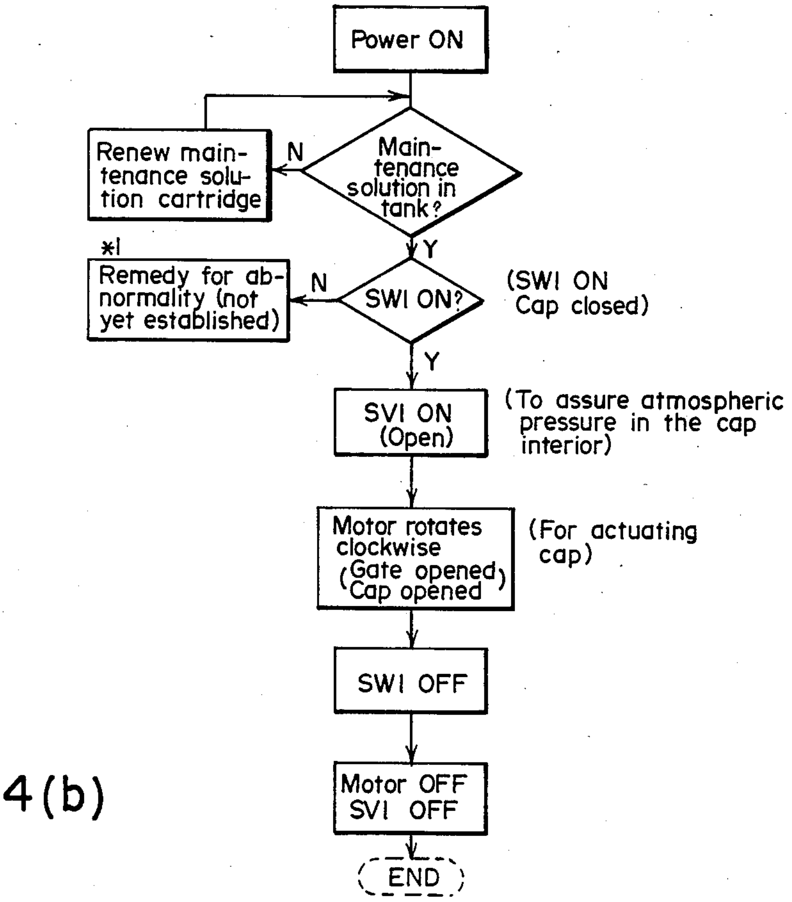
Figure 4C:
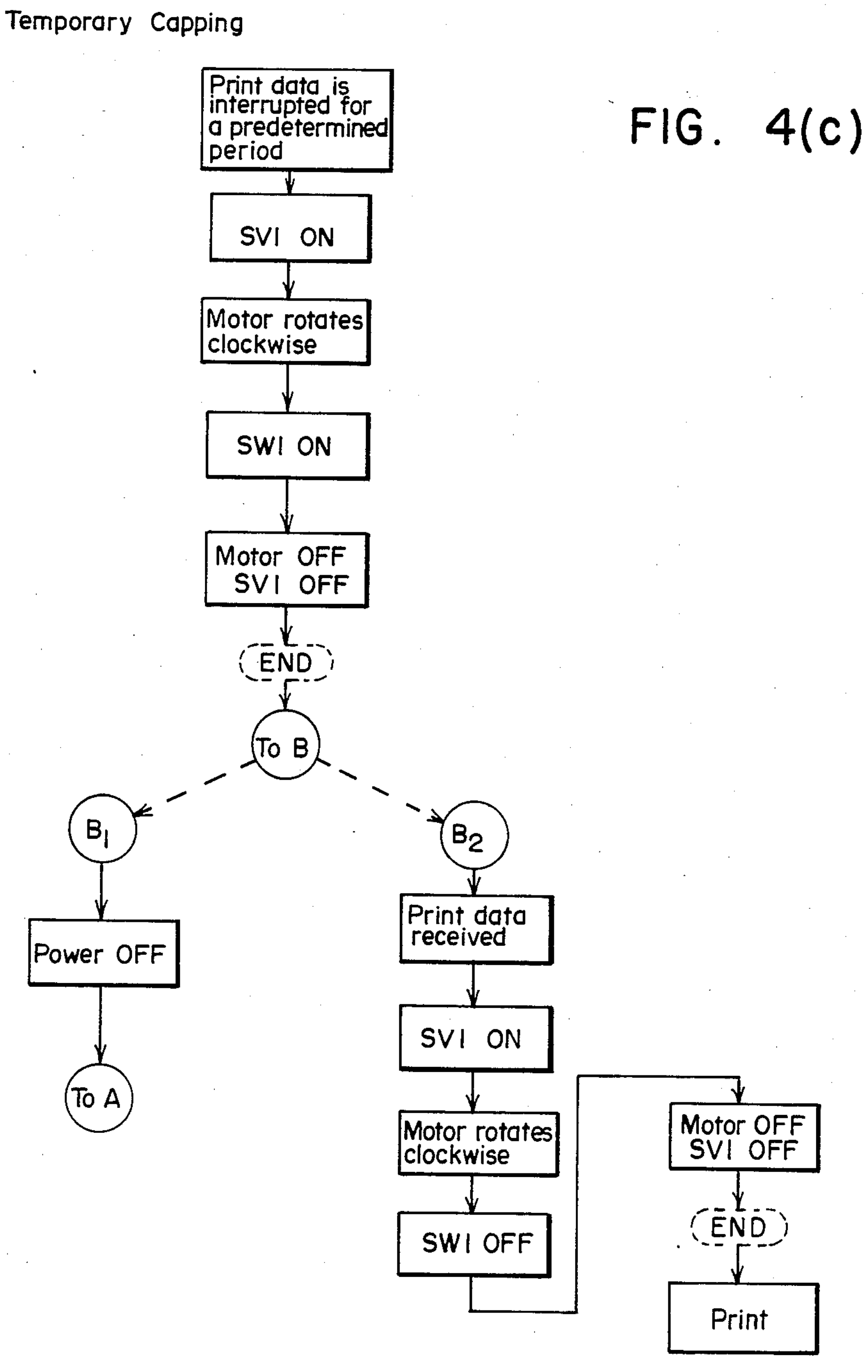
Figure 4D:
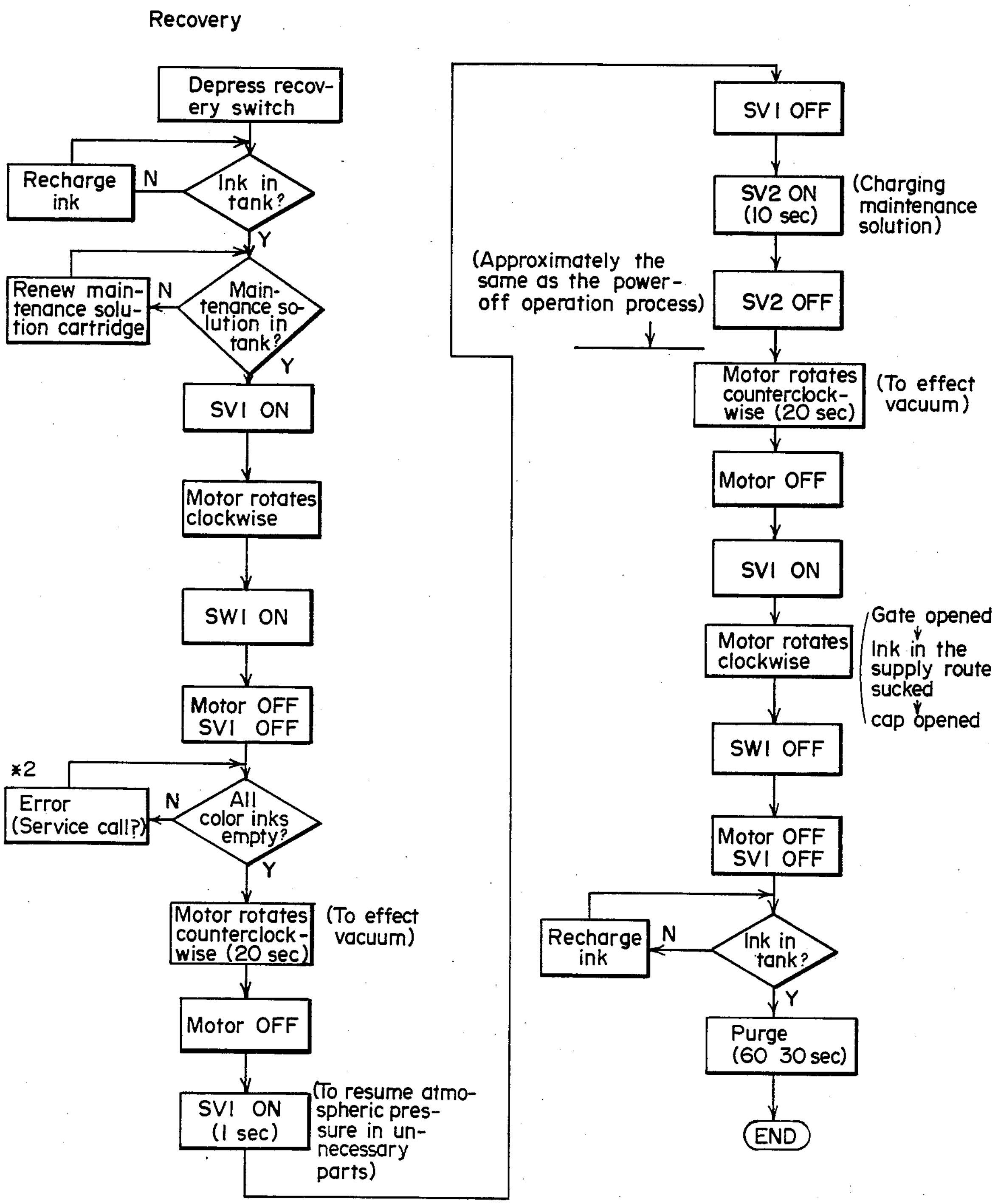

FIG. 1 is a plan view of the printing section of an on-demand type ink jet printer related to the present invention and FIG. 2 shows the construction of a nozzle clog preventive apparatus provided in the printer of FIG. 1.

Referring to FIG. 1, a platen 104 is rotatably supported by frames 101*a* and 101*b*. A rotary mechanism (not shown) is connected to the platen 104 to control its rotation for feeding paper.

Two sliding shafts 4 are mounted in parallel with the platen 104 between the frames 101*a*, 101*b*. A carriage 3 is slidably supported by the sliding shafts 4. The carriage 3 is provided with a wire 103 which is extended around a drum 106 connected to the rotary shaft of a motor 105 and around pulleys 102*a* and 102*b*. Rotation of the motor 105 causes the carriage 3 to reciprocate in the printing zone (travel zone) to the right of the home position 3A for a printing operation or to return to the home position 3A when printing is not conducted (in standby period).

A printing head 1 including an ink spray nozzle hole (orifice) is mounted on the front end of the carriage 3, facing the platen 104. The orifice section of the printing head 1 is composed of a plurality of orifices. An ink tank 2 is mounted in the rear of the carriage 3 to feed ink to the printing head 1.

Figure 3:
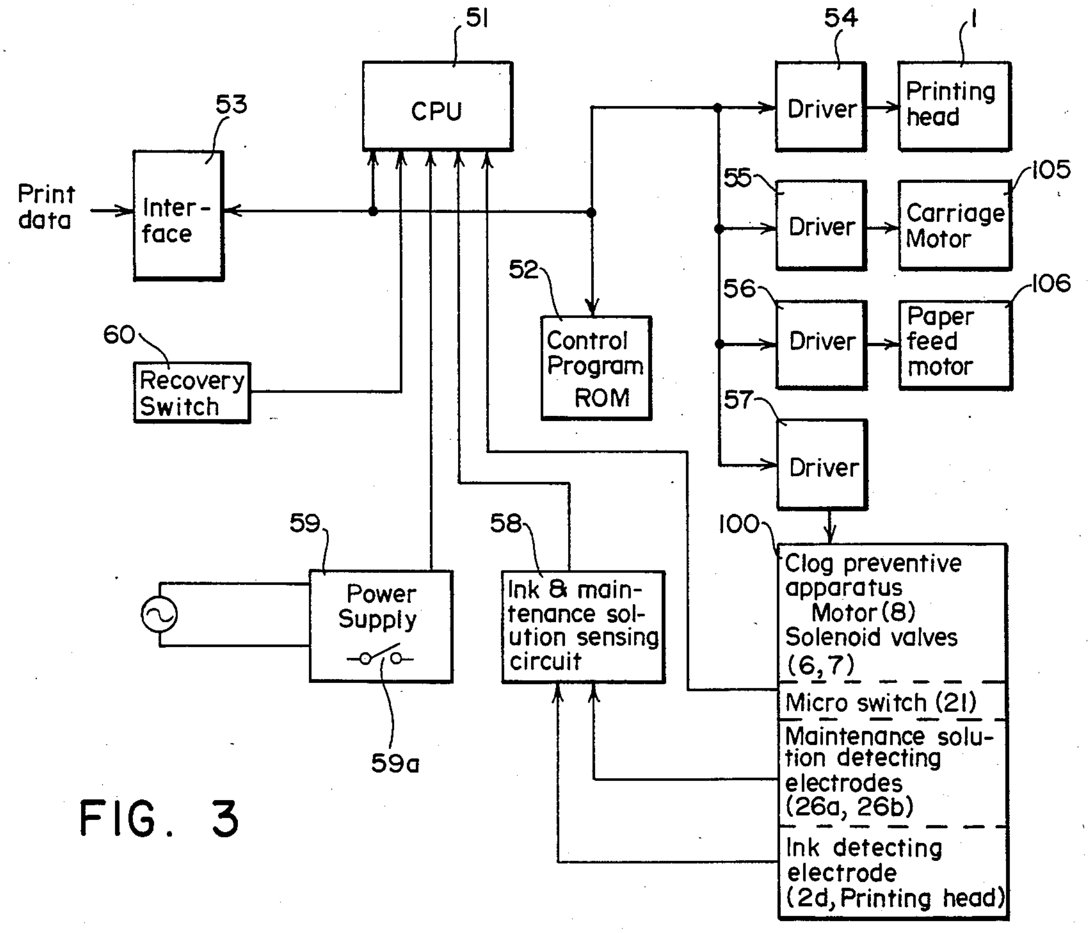
FIG. 3 is a block diagram for explaining the control mechanism of the printer equipped with the nozzle clog preventive apparatus of the present invention.

Printing signals are sent via a cable 32 to the carriage 3 from a control section (See FIG. 3.). The carriage 3 is placed in the home position 3A when the printer is in the standby state for a printing operation, turned OFF, or packed for transportation.

A nozzle clog preventive apparatus 100 with a cap member 5 is provided at the position facing the home position 3A of the carriage 3 so as to cover the printing head nozzle. A tank 28 is mounted at the lower part of the home position 3A to accommodate maintenance solution to be supplied to the nozzle clog preventive apparatus 100 and to accumulate waste solution returned from the printing head 1 and the clog preventive apparatus 100.

The construction of the printing head 1 and the clog preventive apparatus 100 will be described further in detail below with reference to FIG. 2.

The carriage 3 contains a gate valve 2a in an ink passage 2c communicating from the ink tank 2 to the printing head 1, an ink cartridge 30 for recharging the ink tank 2 with ink, and an electrode 2d for detecting ink in the ink tank 2. The gate valve 2a is normally forced by a spring 2b to open the ink passage 2c. When external force is applied to the operating axis of the gate valve 2a against the spring 2b force, the gate valve 2a closes the ink passage 2c.

The above assembly of the ink cartridge 30, ink tank 2, ink passage 2c and gate valve 2a is installed independently for each of a plurality of nozzle blocks in the printing head 1. In a color ink jet printer, for instance, the printing head 1 contains nozzle blocks each corresponding to yellow, magenta, cyan or black in, and the above assembly is provided independently for each nozzle block.

In the printing head 1, ink from each ink passage 2c is led through a nozzle capillary 1a to an ink chamber 1b. The ink is then sprayed through a nozzle hole 1d by an adjacent piezoelectric element 1c.

The specific construction of the clog preventive apparatus 100 is now described below. The cap member 5 for covering the printing nozzle includes a chamber 5b with an opening at the front and a shock absorbing sealing member 5a such as rubber provided on the periphery of the opening.

The chamber 5b with the opening in the cap member 5 is divided into several chamber blocks to correspond to the nozzle blocks. The inlet and outlet ports of the chamber 5b are provided with check valves 5c and 5d, respectively, to prevent each color ink from flowing back to a wrong chamber block and mixing with another color ink, in the cap member 5. The check valve 5c is provided in the maintenance solution inlet port of the chamber 5b. The check valve 5d is provided in the outlet port which leads to a suction pipe 23 for depressurizing the chamber 5b to a negative pressure. The check valve 5d serves to effect an atmospheric pressure in the suction pipe 23 and a pump chamber 9g.

The cap member 5 is rotatably supported by a supporting arm 19 which is pivotally supported at its lower end by the frame. The cap member 5 is normally forced by a pair of springs 18a and 18b to separate from the printing head 1. The force applied against the springs 18a and 18b onto the cap member 5 toward the printing head 1 causes the cap member 5 to shift its position, with the supporting arm 19 as a moving axis, for covering the printing head 1 with the nozzle 5.

The clog preventive apparatus 100 is further provided with a DC motor 8 as a power source. By changing over its polarity, the motor 8 rotates alternatively in the normal (clockwise) or reverse (counterclockwise) direction.

A vacuum pump 31 is mounted in relation to the DC motor 8. The vacuum pump 31 comprises a cylinder 9a, a piston 9b, check valves 9c and 9d, a piston rod 9e, a gear 9f and the pump chamber 9g. A gear 10 directly connected to the motor 8 transmits the rotation of the motor 8 to the gear 9f of the vacuum pump 31.

The inlet and outlet of the vacuum pump 31 are coupled with flexible pipes 23 and 24 respectively. The pipes 23 and 24 are made of a synthetic resin. The other end of the pipe 23 connected to the inlet (suction port) of the pump 31 is connected to the outlet port of the chamber 5b in the cap member 5. The other end of the pipe 24 connected to the outlet (discharge port) of the pump 31 is connected to a waste tank 27 in the tank 28.

A moving mechanism is provided in relation to the motor 8 so as to shift the cap member 5.

A pulley 11, directly connected to the motor 8, transmits the rotation of the motor 8 to a cam shaft 13 through a bolt 12 and a pulley-equipped one way clutch 14. The pulley equipped one way clutch 14 transmits either one of the normal or reverse rotations of the motor 8 to the cam shaft 13. (In the present embodiment, the cam shaft 13 rotates only in clockwise direction viewed from the front of FIG. 2.)

Eccentric cams 15, 16 and 17 are directly engaged with the cam shaft 13. The cam 15 serves to shift the cap member 5 to tightly cover the printing head 1, the cam 16 operates the gate valve 2a via a valve lever 20, and the cam 17 operates a micro switch 21.

A valve lever 20 is rotatably supported at its center by a pivot 20a of the frame 101a and 101b. An end of the valve lever 20 is made in contact with the circumference of the eccentric cam 16, with the other end being positioned on the operating axis of the gate valve 2a. Accordingly, rotation of the cam 16 actuates the valve lever 20 to turn counterclockwise with the pivot 20a as the fulcrum, so that the other end of the lever 20 depresses the operating axis of the gate valves 2a against the spring 2b, causing the gate valve 2a to close the ink passage 2c.

The micro switch 21 detects the rotation angle of the cam shaft 13.

The tank 28 is composed of the maintenance solution tank 26 containing maintenance solution (water or other solvent) and the waste tank 27.

The maintenance solution tank 26 is connected to a flexible pipe 22a the other end of which is connected to a solenoid valve 7. The solenoid valve 7 is connected via a pipe 22b to the chamber 5b in the cap member 5. Thus, when the solenoid valve 7 opens, maintenance solution is led from the tank 26 through the pipes 22a and 22b into the chamber 5b in the cap member 5.

The waste tank 27 is connected via a flexible pipe 25 to a gutter 29, so that waste solution from the printing head 1 and the cap member 5 is collected by the gutter 29 and led through the pipe 25 into the waste tank 27. Waste solution generated in the vacuum pump 31 is also sent through a pipe 24 into the waste tank 27.

The maintenance solution tank 26 contains electrodes (sensors) 26a and 26b which detect solution in the tank 26. The electrode 26b is composed of a metal pipe to serve as a joint with the pipe 22a.

A pipe 23 connecting the cap member 5 with the vacuum pump 31 includes a split pipe 23a on the way. The split pipe 23a is led through a solenoid valve 6 to the atmosphere.

FIG. 3 is a block diagram for explaining the control mechanism of an ink jet printer equipped with the clog preventive apparatus 100 described above.

Referring to FIG. 3, 51 is a main central processing unit (CPU), 52 is a random access memory (ROM) which stores the control program, and 53 is an interface for receiving print data. The CPU 51 controls print data according to the control program stored in the ROM 52.

A driver 54 is provided for the printing head 1, 55 is a driver of the carriage actuating motor 105, 56 is a driver of the paper feeding motor 106 which operates the platen 104, and 57 is a driver of the clog preventive apparatus 100.

The driver 57 controls the operation of the motor 8, solenoid valves 6 and 7, micro switch 21 and electrodes (sensors) 26*a* and 26*b* in the tank 26 of the clog preventive apparatus 100 as well as the ink detecting electrode 2*d* in the ink tank 2.

Element 58 is an ink and maintenance solution sensing circuit into which signals from the electrodes 26*a* and 26*b* and signals and from the ink detecting electrode 2*d* are input. The output from the sensing circuit 58 is led to the CPU 51. A power supply circuit 59 of the printer contains a power switch 59*a* for the printer.

A switch 60 gives an instruction for informing a nozzle recovery operation. The instruction from the switch 60 is also transmitted to the CPU 51.

The ink jet printer related to the present invention has the construction mentioned above and operates in the following sequence. The operation flow is shown in FIG. 4.

(1) Operation when printer power is off or during transportation (See FIG. 4(*a*).)

Assuming the printer power is on, turn off the power switch 59*a*. If a printing operation is under way, the motor 105 rotates by the instruction from the CPU 51 so that the carriage 3 returns to the home position 3A. If the printer is in the standby state, the carriage 3 remains in the home position 3A.

In this case, the power source 59 of the main printer body continues supplying power to the various parts of the printer until the above power-off operation is completed.

When the power-off signal is input into the CPU 51, the apparatus is operated under control of the CPU 51 and the control program ROM 52 as follows. At this time, the apparatus is in the state as shown in FIG. 2.

First, power is supplied to the solenoid valve 6 so that the valve 6 opens (SV1 ON). Then, atmospheric pressure is supplied to the pipe 23 and the pump chamber 9*g*. When an instruction is given to rotate the motor 8 in the clockwise direction, the cam shaft 13 turns clockwise by means of the one way clutch 14 as previously described. The rotation of the eccentric cam 16 actuates the valve lever 20 to close the gate valve 2*a* in the ink tank 2, so that the ink passage 2*c* is isolated from the ink tank 2. The rotation of the eccentric cam 15 causes the cap member 5 to move toward the printing head 1, thereby sealing the printing head nozzle.

At this time, the rotation of the eccentric cam 17 causes the rotation angle detecting micro switch 21 to change over from an OFF position to an ON position. As a result, the motor 8 and the solenoid valve 6 are powered off while the gate valve 2*a* and the cap member 5 maintain their current conditions. That is, the cap member 5 is positioned in close contact with the printing head 1 so that the atmospheric pressure is maintained in the chamber 5*b* of the cap member 5.

To prevent air from entering the nozzle due to pneumatic pressure, the gate valve 2*a* is closed before the cap member 5 comes in contact with the printing head 1.

Then, an instruction is given to effect a counterclockwise rotation of the motor 8. Due to the one way clutch function, the cam shaft 13 does not rotate. The gear 10 rotates to operate the vacuum pump 31 while the eccentric cams 15, 16, and 17 maintain their current positions. Power is supplied to the motor 8 for a predetermined period until the pressure in the chamber 5*b* of the cap member 5 and in the pipes 22*b* and 23 reduces to a predetermined value near the vacuum state by the operation of the pump 31. When the pressure reaches the predetermined value, the motor 8 is turned off. Then, power is supplied to the solenoid valve 6 for a short period so that the atmospheric pressure is effected in the pipe 23 and the pump chamber 9*g*. This helps prevent maintenance solution from flowing to unnecessary parts such as the pipe 23 and the pump chamber 9*g* during the maintenance solution filling process described below, thus saving maintenance solution.

Then, power is supplied to the solenoid valve 7 for a predetermined period to open the valve 7. Since the pressure in the pipe 22*b* and the cap member chamber 5*b* is near the vacuum pressure maintenance solution is sucked from the maintenance solution tank 26 through the pipes 22*a* and 22*b* into the chamber 5*b* of the cap member 5 to fill the nozzle orifice. Consequently, ink is protected from dryness and solidification, air is blocked from entering the nozzle, and the nozzle orifice is protected from contamination.

(2) Operation when printer power is on (See FIG. 4(*b*).)

Turn the power switch 59*a* ON. Power is supplied from the power source 59 to various parts of the printer and a power-on signal is input into the CPU 51. The apparatus is then operated under control of the CPU 51 and the control program ROM 52 as follows.

First, the solenoid valve 6 is powered on to open pipe 23*a*, thereby achieving atmospheric pressure in the pipe 23 and the pump chamber 9*g*. In this atmospheric state, the motor 8 is made to run in the clockwise direction. The cam shaft 13 then rotates clockwise, whereby the closed gate valve 2*a* is opened and the cap member 5 is released from the printing head 1 by the function of the eccentric cams 15 and 16 respectively. At this time, the micro switch 21 is changed over from an ON to OFF position to turn off the motor 8 and the solenoid valve 6. Maintenance solution flowing from the chamber 5*b* of the cap member 5 is collected in the gutter 29 and returned through the pipe 25 into the waste tank 27. Now, the printing head 1 is in the standby state ready for a printing operation.

(3) Temporary cap sealing with printer power on (See FIG. 4(*c*).)

If print data is interrupted for a predetermined period while the printer power is on, the printing head 1 is covered with the cap member 5 to prevent ink in the nozzle from drying and solidifying.

When the CPU 51 detects an absence of print data for a predetermined period, the printer controller operates the apparatus in the following sequence:

First, the solenoid valve 6 is powered on to open pipe 23*a*, thereby achieving atmospheric pressure in the pipe 23 and the pump chamber 9*g*. When the motor 8 is made to run in the clockwise direction in this state, the cam shaft 13 rotates clockwise by the function of the one way clutch 14. The rotation of the eccentric cam 16 actuates the valve lever 20 to cause the gate valve 2*a* to close, isolating the ink passage 2*c* from the ink tank 2, while rotation of the eccentric cam 15 causes the cap member 5 to shift toward the printing head 1, sealing the printing head 1, as mentioned above. Then, the micro switch 21 is changed over from an OFF to an ON position by the function of the eccentric cam 17, so that the motor 8 and the solenoid valve are powered off while the gate valve 2*a* and the cap member 5 maintain their current conditions. To prevent air from entering the nozzle due to pneumatic pressure, the gate valve 2*a* is closed before the cap member 5 comes in contact with the printing head 1.

At this time, maintenance solution sucked during the power-off operation process remains in the recess around the check valves 5*c* and 5*d* in the cap member 5. Therefore, the chamber 5*b* of the cap member 5 is filled with vapor from the maintenance solution. The vapor effectively protects the nozzle orifice of the printing head 1 from clogging. The operation so far is the same as the first half of the power-off operation process.

When print data is input in the printer in this state, the printer controller operates the apparatus in the following sequence to recover the printing head 1 for a printing operation.

The solenoid valve 6 is powered on to open pipe 23*a*, thereby introducing atmospheric pressure into the pipe 23, the pump chamber 9*g*, and the cap member chamber 5*b*. When the motor 8 is made to rotate clockwise, the eccentric cams 15, 16, and 17 rotate by their respective predetermined angles, so that the valve gate 2*a* is opened, the cap member 5 is separated from the printing head 1, and the motor 8 and the solenoid valve 6 are powered off. Thus, the printing head 1 is ready for printing.

If the printing power switch 59*a* is turned off when the printer is in the temporary cap sealing state as mentioned above, the latter half of the power-off operation process is conducted. Specifically, the vacuum pump 31 is actuated to effect the vacuum state in the cap member chamber 5*b* and the pipes 22*b* and 23. Then the solenoid valve 7 is opened to fill the chamber 5*b* with maintenance solution.

(4) Nozzle recovery operation (See FIG. 4(*d*).)

If air enters the nozzle to cause clogging for some reason, bubbles are eliminated from the nozzle by the following operation.

When the recovery switch 60 (FIG. 3) is turned on, the printer controller operates the apparatus as follows:

The first half of this operation process is omitted here because it is completely the same as the entire process of the power-off operation.

Now it is assumed that the cap member 5 is in close contact with the printing head 1 and that the cap member chamber 5*b* and the nozzle capillary 1*a* are filled up with maintenance solution.

Since the gate valve 2*a* is closed, ink does not flow from the ink tank 2 to the printing head 1. In this state, power is supplied to the motor 8 for counterclockwise rotation for a predetermined period. The counterclockwise rotation of the motor 8 does not transmit to the cam shaft 31 but actuates the vacuum pump 31 alone to achieve a nearly vacuum state in the cap member chamber 5*b*. As a result, air bubbles are removed from the nozzle. More specifically, maintenance solution filled in the chamber 5*b* of the cap member 5 is discharged through the pipe 23, pump 31 and pipe 24 into the waste tank 27. After the motor 8 is turned off, the solenoid valve 6 is turned on to open pipe 23*a*, thereby introducing atmospheric pressure into the pipe 23 and pump chamber 9*g*.

At this time, the cap member chamber 5*b* has a negative pressure. Therefore, when the motor 8 is actuated for clockwise rotation to open the gate valve 2*a* and then to separate the cap member 5 from the printing head 1, sticky ink and bubbles in the nozzle section including the ink passage 2*c* and nozzle capillary 1*a* are caused to flow out and be led through the gutter 29 into the waste tank 27. When the cam shaft 13 has rotated to a predetermined angle, the micro switch 21 detects it and emits a signal so that the motor 8 and solenoid valve 6 are turned off. Thus, the printing head 1 is recovered to the normal state and is ready for a printing operation.

According to the present invention, as understood from the above description, the nozzle clog preventive apparatus utilizes only one cap member to cover the printer nozzle, and an appropriate nozzle clog preventing operation is conducted automatically according to the printer state (that is, whether the printer is out of service with power on, is turned off for transportation or long term storage, or requires a nozzle recovery operation). When the printer is out of service with power on, the nozzle is simply covered with the cap member. When the printer is turned off for transportation or long term storage, the nozzle is covered with the cap member and maintenance solution is allowed to fill the cap member chamber, to prevent ink from drying and solidifying. When the printer requires a nozzle recovery operation, following the above power-off operation process, the pump means is actuated to depressurize the cap member chamber, allowing bubbles to come out of the nozzle. Thus, according to the present invention, three different operations can be achieved automatically by one cap member of the clog preventive apparatus without involving troublesome manual operation for charging the maintenance solution and for recovering a clogged nozzle. Therefore, the possibility of erroneous handling and operation is eliminated, and reliability of the nozzle in ink jet performance is enhanced. In addition, since the invention requires only one cap member, the number of necessary parts is reduced, effecting a simpler construction.

After the printing head 1 is covered with the nozzle cap member 5, a negative pressure is generated in the cap member chamber by the vacuum pump to lead maintenance solution into the cap member chamber. The negative pressure for this purpose must be within the range from about 40 to about 50 Torr (mmHg) because of the following reason: If the negative pressure in the cap member chamber were lower than the above specified range, even very small bubbles if any in the nozzle would expand because of the very low ambient pressure. When the cap member is released from the printing head, the expanded bubbles would rapidly contract (PV=constant, P: pressure, V: volume), causing air to enter the nozzle.

While only certain embodiments of the present invention have been described, it will be apparent to those skilled in the art that various changes and modifications may be made therein without departing from the spirit and scope of the present invention as claimed.

What is claimed is:

1. An ink jet printer nozzle clog preventive apparatus comprising: